United States Patent
Charlton

[15] 3,638,397
[45] Feb. 1, 1972

[54] GAS ANALYSIS SYSTEM AND METHOD

[72] Inventor: Kyle W. Charlton, Oxnard, Calif.

[73] Assignee: California Institute of Technology, Pasadena, Calif.

[22] Filed: Aug. 25, 1969

[21] Appl. No.: 852,770

[52] U.S. Cl..................................55/16, 55/158, 55/197
[51] Int. Cl..........................................B01d 15/08
[58] Field of Search..................55/67, 197, 386, 16, 158; 73/23.1

[56] References Cited

UNITED STATES PATENTS

| | | | |
|---|---|---|---|
| 3,238,700 | 3/1966 | Cohn | 55/16 |
| 3,319,458 | 5/1967 | Curren | 55/197 X |
| 3,400,514 | 9/1968 | Noda | 55/386 X |
| 3,421,292 | 1/1969 | Llewellyn | 55/197 X |
| 2,430,417 | 3/1969 | Cree | 55/67 X |

Primary Examiner—J. L. DeCesare
Attorney—Samuel Lindenberg and Arthur Freilich

[57] ABSTRACT

A gas sample dispersed in a first carrier gas such as hydrogen is enriched by introducing into the dispersion at a controlled flow rate a mixture of a second carrier gas such as helium diluted with first carrier gas and passing the dispersion through a gas transfer device such as a heated palladium tube which is selectively permeable to the first carrier gas.

8 Claims, 1 Drawing Figure

PATENTED FEB 1 1972
3,538,397
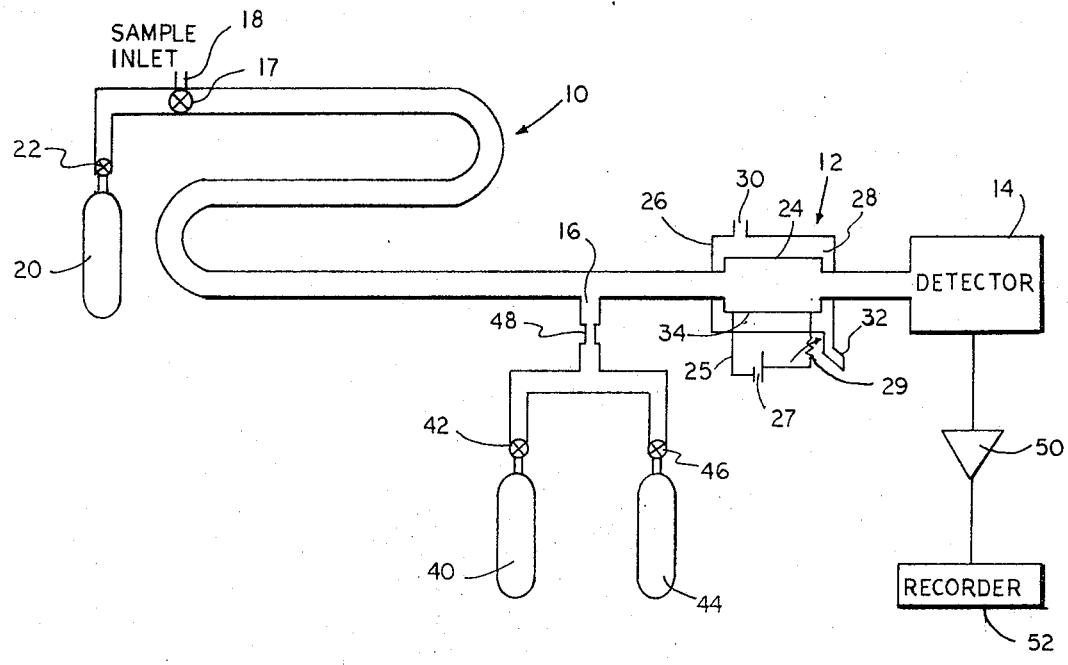
INVENTOR.
KYLE W. CHARLTON
BY Lindenberg & Freilich
ATTORNEYS.

GAS ANALYSIS SYSTEM AND METHOD

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

The present invention relates to apparatus and methods for analyzing gas samples and more particularly, to a sensitive and accurate system for analysis of chromatographically separated constituents of microsized samples.

2. Description of the Prior Art

Analysis of complex samples of matter is greatly facilitated by gasifying the sample and then passing it in gasified form through a separation device such as a gas chromatograph which separates the components of the sample into sequential analytical component streams. In a gas chromatograph or other separation apparatus, gas or vapor sample to be analyzed is transported through the various functional parts of the apparatus by a stream of inert carrier gas. While this procedure facilitates automation of analysis, it does however introduce other problems. Thus, the sample is diluted by the carrier gas and consequently small volume samples may be difficult to detect when so diluted. Also, many of the detectors used to provide an electrical signal from the gas or vapor are accurate only if the carrier gas flow rate is held substantially constant.

Reliable detectors such as thermal conductivity, ionization cross section or gas density balance detectors are concentration-sensing devices. With such detectors, changes in carrier gas flow rate directly alter the sample concentration and consequently affect the accuracy of measurement. These detectors produce a signal related to the concentration of sample gas or vapor in the carrier gas. Consequently any variation in the flow rate of carrier gas after the injection of a sample will be followed by a corresponding change in the sample concentration. The detector faithfully follows these changes in sample concentration and the time integral of its signal will not be an accurate measure of the quantity injected. The conditions for accurate analysis using these otherwise excellent detectors are therefore limited to those situations in which the carrier flow rate can be maintained strictly constant.

In practice, it is difficult to maintain the flow rate of carrier gas constant throughout the complete chromatographic apparatus. Many sources of variations exist including surges due to sample introduction and changes in column resistance. Thus even though the flow rate at the input to the column may be constant, the flow rate of the segregated stream components at the outlet to the column can vary substantially. The dilution of a particular sample constituent in the carrier gas depends upon the volume of carrier gas at the instant at which the constituent is swept into the carrier stream before it leaves the column. If the stream velocity is fast at that instant, the total carrier gas volume is larger and the concentration of the constituent may differ from its concentration in the input stream.

Moreover, techniques such as flow and temperature programming are utilized to enhance the effectiveness of segregating the components by the column and greatly improve the speed of analysis and often also the resolution of the constituents. In practice these techniques cannot however be used with concentration-sensitive sensors due to the changes in the column gas flow rate which inevitably attend their use.

Some improvement can be obtained by the use of an enrichment procedure in which a portion of the carrier gas is removed under conditions in which the sample vapors are unaffected. This is achieved to some extent in commonly used gas chromatographic-mass spectrometer separator systems. While such procedures undoubtedly increase the sensitivity of the system, it is very difficult to maintain the enrichment ratio constant and indeed it varies even more in the case where enrichment is not practiced. Analytical accuracy is therefore decreased rather than increased.

In copending application Ser. No. 852,690 filed concurrently herewith by James E. Lovelock for Gas Chromatograph Interfacing System, there is disclosed an improved procedure and apparatus for enriching a gas sample by totally removing the first carrier gas and transferring the sample to a minor amount of a second carrier gas introduced at a controlled constant flow rate into the chromatographic column effluent. The effluent is then passed through a carrier gas transfer device which is totally and selectively permeable to the first carrier gas.

However, it is not practical to fully realize the potential of this technique. The enrichment ratio is inversely proportional to the amount of second carrier gas introduced. The present state of the art does not provide metering apparatus capable of maintaining the flow rate of the second carrier gas constant at extremely low flow rates.

OBJECTS AND SUMMARY OF THE INVENTION

It is therefore an object of this invention to increase the sensitivity and reliability of gas analysis systems.

Another object of the present invention is to provide for the elimination of variations in the flow rate of vapor sample through the detector portion of a gas chromatographic system.

A further object of the invention is the provision of a highly sensitive chromatographic gas analysis apparatus capable of flow and temperature programming and yet providing accurate and reliable quantitative data.

A further object of the invention is the provision of a gas analysis system capable of accurately analyzing very small quantities of sample.

These and other objects and many attendant advantages of the invention will become apparent as the description proceeds.

In accordance with the present invention the concentration of a gas sample is enriched by dispersing the sample in a first carrier gas, introducing a lesser amount of a second carrier gas diluted with first carrier gas into the dispersion and passing the resultant mixed carrier gas dispersion of sample through a transfer device selectively permeable to the first carrier gas whereby the first carrier gas is removed from the dispersion and the concentration of the sample in the second carrier gas is increased.

A gas analysis apparatus according to the invention includes means for separating a dispersion of gas sample in a first carrier gas into components; means for detecting the components; a carrier gas transfer device selectively permeable to a first carrier gas for receiving the effluent from the separating means and for delivering the transfer effluent to the detector means and mixed carrier gas introduction means for introducing a mixture of a first and second carrier gas into the transfer device.

The invention will now become better understood by reference to the following detailed description when considered in conjunction with the accompanying drawing.

BRIEF DESCRIPTION OF THE DRAWING

The FIGURE is a schematic view of a gas analysis system according to the invention.

DESCRIPTION OF THE PREFERRED EMBODIMENTS

Referring now to the FIGURE the system generally includes a gas separation column 10, a carrier gas transfer device 12, a detector 14 and a mixed carrier gas inlet 16 disposed to introduce the mixed gas into the effluent from the separation column 10 before it enters the transfer device 12.

The column 10 can consist of a series of adsorbents which segregate the gas sample by affecting the rate at which the components or constituents of the sample flow through the column to provide an effluent containing a sequential passage of the components. The sample in vaporous form is introduced through sample inlet 18 and is metered into the column 10 through sample introduction valve 17 positioned before the entrance to the column 10. The sample is conveyed through the column 10 by dispersing it within a first carrier gas which is introduced at a constant pressure and flow rate from cylinder 20 which contains a pressure and flow regulating value head 22.

The effluent from column 10 passes through the carrier gas transfer device 12 before entering the detector 14. The transfer device 12 is selected to be permeable to the first carrier gas but not to any other gas so that the first carrier gas is eliminated through the walls of the device 12. Thus, the components of the effluent are left suspended in the second carrier or scavenge gas. The stream enriched in sample passes into detector 14.

The first carrier gas may be hydrogen of high purity and the transfer device may then comprise a thin film of heated palladium. Palladium and its alloys are remarkably permeable to hydrogen as long as the film is maintained at a temperature above about 100°–150° C. The film is suitably maintained at temperatures below 600° C. to avoid unnecessary rearrangement of components subject to catalytic hydrogenation or rearrangement in the presence of heated palladium.

Referring again to the FIGURE the transfer device 12 may be in the form of a thin wall tube 24 of palladium surrounded by an outer container 26 forming an annular first carrier gas exhaustion space 28. The inlet end of the tube 24 is connected to the outlet from the gas chromatographic column 10 and the outlet end of the tube 24 is connected to the inlet end of the detector 14.

The wall of the tube 24 is heated to a temperature at which the tube becomes permeable to hydrogen, suitably from 200° to 500° C. The heating means may comprise electrical leads 25 directly attached to the tube 24. The heating circuit includes a power source 27 and a variable resistor 29. Pure palladium when subject to temperature cycling in the presence of hydrogen suffers mechanical distortions. However, an alloy of palladium containing 25 percent silver is as permeable to hydrogen as pure palladium, but is mechanically stable. The palladium tube may be provided in various configurations and lengths of tubing may be wound in spirals or other shapes to compress and conserve space and plural lengths may be connected in parallel to provide increased surface area with less flow resistance.

During hydrogen removal from the effluent a reaction is believed to occur involving the formation of palladium hydride on the inner surface of the tube 24. The elevated temperature causes decomposition of the hydride to reform hydrogen which transfers through the wall of the tube to the outer surface 34.

The transfer rate of hydrogen may be enhanced by providing a pressure differential across the tube wall such as by increasing the internal pressure or by applying vacuum to the annular space 28. However, since the hydride-forming reaction is reversible through the wall of the tube 24, it is preferable to feed a hydrogen-reactive gas into the space 28 through inlet 30. For example, oxygen in the presence of palladium reacts with the hydrogen emerging from the outside surface 34 of the tube to form water. The water can exit through the outlet drain 32. However, the gasified constituents of the sample are confined by the walls of the tube 24 and exit through the outlet end of the tube.

The essential difference between the enrichment schemes of the prior art and that of the present technique is that all of the first carrier gas is removed in the transfer device 12. Complete removal of carrier gas, however, may also remove the propulsive means needed to convey the enriched, segregated sample constituents to the detector. There may be some slow drift which could result in the segregated constituents recombining. This would cause inconclusive readings by the detector 14.

In accordance with the invention, this sample is conveyed to the detector in a constant predetermined flow of a second carrier gas. The second carrier gas emanates from a supply source such as a cylinder 40 of pressurized helium. The helium is metered through valve head 42 into a stream of first carrier gas supplied from a cylinder 44 having a regulating valve 46. The combined and mixed stream flows through a restriction 48 so as to enter the tube 24 at a constant flow rate. As the first carrier gas is eliminated through the walls of the tube 24, the sample components are left suspended in the second carrier or scavenge gas. The concentrated stream then passes to the detector.

By accurately controlling the rate of flow of helium at the point of introduction, a more uniform concentration of sample constituents will be produced. Since the helium is introduced after the obstacles affecting flow, only the constant flow rate of helium containing the sample constituents emerges from the transfer device. The possibility of stalling in the device and resultant recombination of the constituents is obviated by scavenging or sweeping the constituents out of the device within the helium stream.

The volume of helium introduced may be varied over wide ranges. The sample volume is typically below ten (10) percent of the main carrier gas dispersion and preferably is only one (1) percent of the volume of the dispersion. By introducing an amount of helium equal to that of the sample, the sample constituent concentration is increased from one (1) percent in hydrogen to fifty (50) percent in helium. It has been found in practice that available equipment is not capable of accurately introducing the second carrier gas at rates below about 1 ml. per minute. It is apparent that if the amount of helium that can be added to the transfer device could be reduced even further to a rate still sufficient to convey the effluent through the transfer device and detector that a proportional further increase in sensitivity would be realized.

In accordance with the present 1ml. the flow rate of the second carrier gas into the transfer device 12 may be further reduced conveniently by diluting the second carrier gas with a gas permeable to the walls of the transfer device 12. The dilution gas may be identical to the first carrier gas. For example, for a one (1) percent volume sample dispersed in a 100-ml. per minute stream of hydrogen, the introduction of a ten (10) percent helium-ninety (90) percent hydrogen mixed carrier gas at a constant flow rate of 1 ml. per minute into the transfer device 12 would provide a tenfold increase in sensitivity or sample concentration from 1/1 to 10/1. Such a procedure is possible and practical utilizing conventional fittings and valving. This capability is quite important in the detection of trace substances or in analysis of microsized samples.

With the apparatus of the invention the detectors may operate at their least detectable quantity level. With a conventional gas chromatograph incorporating a colligative property detector, both the peak area and the peak height corresponding to a given mass of test substance are functions of the carrier gas flow rate. The peak area which determines accuracy of analysis and peak height which determines sensitivity are inversely related to the carrier flow rate.

In addition, the least detectable quantity a colligative property detector can detect in isolation is:

$$D = K \cdot (PV/T)$$

where $K$ is an overall constant for the detector; and $V$ is the volume of gas within the detector at the prevailing temperature ($T$) and pressure ($P$) conditions. It follows that the least detectable quantity can be progressively reduced by decreasing pressure or volume or by raising the temperature. With the ionization cross section and thermal conductivity detectors the practical lower limit of volume is in the region of 10 microliters. At this volume, the least detectable quantity is $3 \times 10^{-}$grams. This sensitivity to small masses shown by small volume colligative property detectors can only be realized under a restricted condition of operation. According to the invention it is not necessary to scale down the entire apparatus since the sample is isolated from the first carrier gas by the transfer device which can be presented to the detector in a very small enriched volume.

The detector 14 may be a conventional colligative property sensor such as a thermal conductivity, ionization cross section or gas density balance detector or a mass spectrometer or any combination of detectors so as to determine the identity and amount of each segregated constituent flowing from the column. A signal from the detector is amplified in amplifier 50 before being applied to a data storage or readout device such as a chart recorder 52.

The improved enriching technique also serves to eliminate the large volume of gas required for operation of a gas chromatograph. The reduced volume becomes manageable and does not overload the vacuum system of the mass spectrometer. The maximum volume manageable by the detector has usually dictated the scaling down of the column to match the flow impedance of the detector. However, with the enrichment process according to the invention, larger columns may be utilized and the flow impedance of any detector of mass spectrometer ion source may be matched exactly by controlling the low flow rate of the second carrier gas. This is achieved with a dramatic gain in sensitivity and with the ability to utilize the column in the variable temperature and flow programming flow modes.

The gas analysis system of the invention may be utilized to analyze organic or inorganic material. Solid or liquid materials may be analyzed by converting the sample to vaporous form by pyrolytic or other suitable means. The sensitivity of the system to small volume samples renders it very effective for planetary exploration especially for analysis of atmospheric gases or small solids or liquid samples for indication of life or life-supporting compounds.

It is to be realized that only preferred embodiments of the invention have been disclosed and that numerous substitutions, alterations and modifications are all permissable without departing from the spirit and scope of the invention.

What is claimed is:

1. A method of analyzing a material comprising the steps of:

dispersing the material in hydrogen as a first carrier gas to form a dispersion;

flowing the dispersion through a gas chromatographic separator to form an effluent in which the components of the material are separated into sequential fractions dispersed in hydrogen carrier gas;

introducing a mixture of hydrogen and helium as a second carrier gas into the effluent;

passing the effluent containing the first and second carrier gases through a gas transfer device including a palladium-containing film which is selectively and totally permeable to hydrogen carrier gas and impermeable to helium carrier gas to thereby remove the hydrogen carrier gas from the effluent by transferring hydrogen through said film and transfer the components to the helium carrier gas; and detecting the presence of the components dispersed in the helium carrier gas.

2. A method according to claim 1 in which the flow rate of helium carrier gas is maintained constant and the detector is sensitive to changes in flow rate.

3. A method according to claim 1 in which the flow rate of helium carrier gas into the effluent is less than the flow rate of hydrogen gas introduced into the effluent.

4. A method according to claim 3 in which the flow rate of helium carrier gas is less than the flow rate of the material.

5. A method according to claim 4 in which the flow rate of helium carrier gas is less than 1 ml. per minute.

6. A method according to claim 1 in which the transfer device comprises a tube of palladium heated to a temperature at which the walls of the tube are selectively permeable to hydrogen.

7. A method according to claim 6 in which the tube comprises a palladium-silver alloy heated to a temperature of 150° to 600° C.

8. A method according to claim 6 further including the step of applying an oxygen-containing atmosphere to the outside surface of the tube.

* * * * *